United States Patent 3,801,678
.tented Apr. 2, 1974

3,801,678
PHOSPHONOPROPIONIC ACID AMIDES
Hermann Nachbur, Dornach, and Arthur Maeder, Therwil, Switzerland, assignors to Ciba-Geigy AG, Basel, Switzerland
No Drawing. Filed May 2, 1972, Ser. No. 249,640
Claims priority, application Switzerland, May 13, 1971, 7,048/71
Int. Cl. C07f 9/40; C09k 3/28
U.S. Cl. 260—943    6 Claims

ABSTRACT OF THE DISCLOSURE

The subject of the invention are phosphorus compounds of the formula (1) 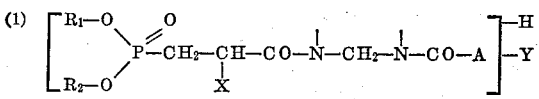

wherein $R_1$ and $R_2$ each denote alkyl, alkenyl or halogenoalkyl with at most 4 carbon atoms, X denotes hydrogen or methyl, Y denotes hydrogen or —$CH_2$—O—Z, Z denotes hydrogen or alkyl with 1 to 4 carbon atoms and A denotes alkyl or halogenoalkyl with at most 4 carbon atoms.

These phosphorous compounds are above all suitable as flameproofing agents, particularly for polyurethane and cellulose containing textiles.

---

The subject of the invention are phosphorus compounds of the formula (1) 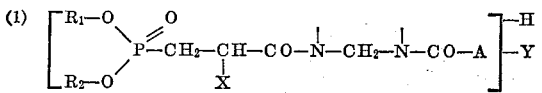

wherein $R_1$ and $R_2$ each denote alkyl, alkenyl or halogenoalkyl with at most 4 carbon atoms, X denotes hydrogen or methyl, Y denotes hydrogen or —$CH_2$—O—Z, Z denotes hydrogen or alkyl with 1 to 4 carbon atoms and A denotes alkyl or halogenoalkyl with at most 4 carbon atoms.

Phosphorus compounds of the formula (2) 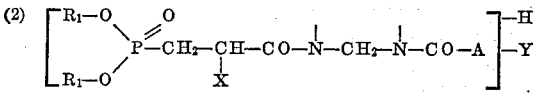

wherein $R_1$, X, Y and A have the indicated meaning, are preferred.

In the Formula 1, the radicals $R_1$ and $R_2$ can be identical or different from one another. $R_1$ and $R_2$ in the Formulae 1 and 2 can represent, for example, chloroalkyl groups such as 2-chloroethyl or 2,3-dibromopropyl groups, alkyl groups, n-butyl, secondary and tertiary butyl, n-propyl, isopropyl and above all ethyl or especially methyl groups.

The radical A in the Formulae 1 and 2 can represent an alkyl radical with 1 to 4 carbon atoms such as n-butyl, n-propyl, isopropyl or especially ethyl or methyl. Possible halogenoalkyl radicals A are monohalogenated or polyhalogenated alkyl radicals with 1 to 4 carbon atoms, such as, for example, chloromethyl, 2,3-dichloropropyl, 2,3-dibromopropyl, trichloromethyl or 2-chloroethyl.

Phosphorus compounds of the formula (3) 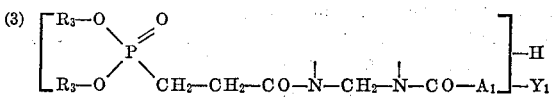

wherein $R_3$ denotes methyl or ethyl, A denotes alkyl or halogenoalkyl with 1 or 2 carbon atoms, $Y_1$ denotes hydrogen or —$CH_2$—O—Z and Z denotes hydrogen or methyl are of particular interest.

If Y or $Y_1$ represents an optionally etherified methylol group, this methylol group is bonded to one of the free valencies of the two nitrogen atoms.

Particularly advantageous phosphorus compounds correspond to the formulae (4) 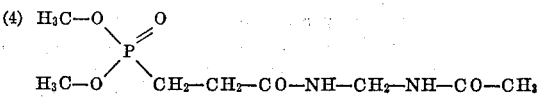

(5) 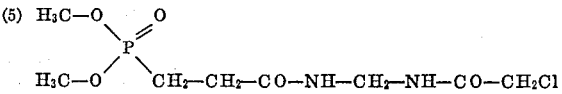

and (6) 

The compounds of the Formulae 1 to 6 are appropriately manufactured by reacting a phosphonopropionic acid amide and a carboxylic acid amide, with one of the amides being methylolated and optionally etherified, with one another and subsequently additionally optionally post-methylolating and optionally etherifying the product.

The process for the manufacture of phosphorus compounds of the Formula 1 is characterized in that (a) a phosphonopropionic acid amide of the formula (7) 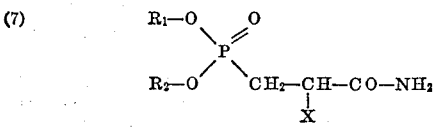

is reacted with (b) a carboxylic acid amide of the formula (8)     

with the amide group of one of the components (a) and (b) being monomethylolated and optionally etherified with an alkanol with 1 to 4 carbon atoms and $R_1$, $R_2$, X and A having the indicated meaning, and subsequently (c) the product is optionally methylolated with formaldehyde or a formaldehyde donor and (d) is optionally etherified with an alkanol with 1 to 4 carbon atoms.

Preferably, a phosphonopropionic acid amide of the formula (9) 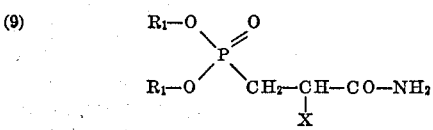

wherein $R_1$ and X have the indicated meaning, is used as component (a).

A particularly preferred component (a) corresponds to the formula

(10) 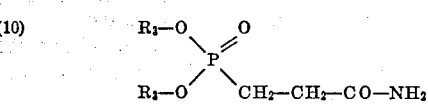

wherein $R_3$ denotes methyl or ethyl.

The preferentially used component (b) corresponds to the formula

(11)     

wherein A has the indicated meaning.

In the manufacturing process, the procedure followed is thus always that either the component (a) is present as an optionally etherified N-methylol compound and the component (b) as an unsubstituted amide or the component (b) is present as an optionally etherified N-methylol compound and the component (a) as an unsubstituted amide.

The reaction of the two components is appropriately carried out in the presence of an acid catalyst, such as p-toluenesulphonic acid, hydrochloric acid or sulphuric acid. As a rule, the reaction is carried out in the presence of an inert organic solvent, such as benzene, toluene or xylene. Reaction temperatures of 100 to 150 C. are the rule. The components (a) and (b) are appropriately employed in approximately equimolar amounts.

The post-methylolation, which is not obligatory, is carried out in accordance with customary methods. A possible formaldehyde donor is above all paraformaldehyde, but preferably methylolation is carried out with aqueous formaldehyde.

The methylol group located on one of the amide nitrogen atoms can further optionally be etherified with an alkanol, such as n-butanol, n-propanol, isopropanol, ethanol or above all methanol.

The phosphorus compounds of the Formula 1 are above all suitable for use as flameproofing agents. They are used, in particular, for the flameproofing of polyurethane foams or polyurethane coatings on fibre material containing cellulose.

Phosphorus compounds of the Formula 1 wherein Y represents an optionally etherified methylol group are additionally also suitable for the flameproofing of fabrics containing cellulose. For this they are advantageously used together with a curable aminoplast precondensate.

The fibre materials containing cellulose are provided with a flameproof finish by applying to these materials an aqueous preparation which contains at least one phosphorus compound of the Formula 1 which preferably contains methylol groups, drying the materials and subjecting them to a heat treatment.

The pH value of the aqueous preparations which contain the compounds of the Formula 1 and are to be used for the flameproofing of material containing cellulose is advantageously less than 5, in particular less than 3. In order to achieve this, strong mineral acids, such as sulphuric acid, nitric acid, hydrochloric acid or preferably orthophosphoric acid are added to the preparations. Instead of the acids themselves, especially of hydrochloric acid, it is also possible to use compounds from which the corresponding acids are easily formed in water by hydrolysis, for example even without warming. As examples there may here be mentioned phosphorus trichloride, phosphorus pentachloride, phosphorus oxychloride, thionyl chloride, sulphuryl chloride, cyanuric chloride, acetyl chloride and chloroacetyl chloride. On hydrolysis, these compounds yield exclusively acid decomposition products, for example cyanuric acid and hydrochloric acid. It may be advantageous, instead of employing one of the strong acids mentioned, to employ the acid mixtures which correspond to the hydrolysis products of one of the compounds just mentioned, that is to say, for example, to employ instead of hydrochloric acid alone a mixture of hydrochloric acid and orthophosphoric acid, appropriately in the molecular ratio of 1:5, which corresponds to phosphorus pentachloride.

The conjoint use of these acid catalysts can admittedly be advantageous but it is not absolutely essential for achieving flameproof effects.

The preparations for flameproofing can also contain a latent acid catalyst for accelerating the curing of the aminoplast precondensate which may be present and for crosslinking the compounds of the Formula 1. As latent acid catalysts it is possible to use the catalysts known for curing aminoplasts on material containing cellulose, for example ammonium dihydrogen orthophosphate, magnesium chloride, zinc nitrate and above all ammonium chloride.

Apart from the compounds of the Formula 1 and the additives required for adjusting the pH value or the curing catalysts, the preparations to be used according to the invention can contain yet further substances. An addition of aminoplast precondensate can be advantageous for achieving a good wash-resistant flameproof finish but is not essential.

By aminoplast precondensates there are understood addition products of formaldehyde to nitrogen compounds which can be methylolated. 1,3,5-aminotriazines may be mentioned, such as N-substituted melamines, for example N-butylmelamine, N-trihalogenomethylmelamines, as well as ammeline, guanamines, for example benzoguanamine or acetoguanamine, or also diguanamines. Further possible substances are: alkyl- or aryl-urea and -thioureas, alkyleneureas or alkylenediureas, for example ethyleneurea, propyleneurea and acetylenediurea, or especially 4,5-dihydroxyimidazolidone-2 and derivatives thereof, for example 4,5-dihydroxyimidazolidone-2 substituted by the radical —CH$_2$CH$_2$CO—NH—CH$_2$OH at the hydroxyl group in the 4-position. Preferably, the methylol compounds of a urea, of an ethyleneurea or of melamine are employed. In general, products which are as highly methylolated as possible yield particularly valuable products. Suitable aminoplast precondenates are both predominantly monomolecular aminoplasts and also more highly precondensed aminoplasts.

The ethers of these aminoplast precondensates can also be used together with the compounds of the Formula 1. The ethers of alkanols such as methanol, ethanol, n-propanol, isopropanol, n-butanol or pentanols, for example, are advantageous. However, it is desirable that these aminoplast precondensates should be water-soluble, as is, for example, pentamethylol-melamine dimethyl ether.

It can also be advantageous if the preparations contain a copolymer, obtainable by polymerization in aqueous emulsion, of (a) 0.25 to 10% of an alkaline earth salt of an $\alpha,\beta$-ethylenically unsaturated monocarboxylic acid, (b) 0.25 to 30% of a N-methylolamide or N-methylolamide-ether of an $\alpha,\beta$-ethylenically unsaturated monocarboxylic or dicarboxylic acid and (c) 99.5 to 60% of at least one other copolymerizable compound. These copolymers and their manufacture are also known. The tensile strength and abrasion resistance of the treated fibre material can be favorably influenced by the conjoint use of such a copolymer.

As a further additive which is advantageous in some cases, a plasticizing finishing agent, for example an aqueous polyethylene emulsion or ethylene copolymer emulsion, should be mentioned.

The preparations can furthermore also contain solubilizing agents, such as water-miscible organic solvents, for example ethanol or methanol.

The content of compound of the Formula 1 in the aqueous preparation is appropriately so chosen that 15 to 40% are applied to the material to be treated. Here it is necessary to take into account that the commercially available textile materials of natural or regenerated cellulose are capable of absorbing between 50 and 120% of an aqueous preparation. As a rule, the aqueous preparations contain 200 to 700 g./l., preferably 300 to 500 g./l., of phosphorus compound of the Formula 1.

The amount of the additive which is required to adjust the hydrogen ion concentration to a value of less than 5 depends on the selective value itself and on the nature of the additive but in any case must not be less than a certain minimum. A certain excess over this minimum amount is generally advisable. Large excesses do not offer any advantages and can even prove harmful.

If additionally a polymer of the indicated type is added to the preparation, the amount added is advantageously small, for Example 1 to 10%, relative to the amount of the compound of the Formula 1. The same is true of a plasticizer which may be present, in which case the appropriate amounts can again be 1 to 10%.

The preparations are now applied to the fibre materials, especially textiles, containing cellulose, for example linen, cotton, rayon, viscose staple or fibre mixtures of such materials and others, such as wool, polyamide or polyester fibres, and this application can be effected in a manner which is in itself known. Advantageously, piece goods are used and are impregnated on a padder of the customary construction, which is fed with the preparation at room temperature.

The fibre material impregnated in this way now has to be dried and this is appropriately done at temperatures of up to 100° C. Thereafter it is subjected to a dry heat treatment at temperatures of above 100° C., for example between 130 and 200° C., and preferably between 140 and 170° C., and the duration of this treatment can be the shorter, the higher is the temperature. This duration of warming is, for example, 2 to 6 minutes at temperatures of 140 to 170° C.

A rinse with an acid-binding agent, preferably with aqueous sodium carbonate solution, for example at between 40° C. and the boiling point, and for 3 to 10 minutes, is advisable in the case of a strongly acid reaction medium.

As already indicated it is possible to obtain, in accordance with the present process, flameproof finishes which largely remain preserved even after repeated washing or dry-cleaning and which do not cause any unacceptable deterioration in the mechanical textile properties of the treated material. The finishes are in particular also distinguished by good stability of hypochlorite.

The compounds of the Formula 1 are appropriately incorporated into the polyurethane foams or coatings by adding them to the mixture for the manufacture of the foams, or to the coating compositions.

These manufacturing mixtures have the composition which is customary for the manufacture of polyurethane foam. As a rule, they contain polyethers with free hydroxyl groups, for example polyols and diisocyanates, such as, for example, 4,4'-diphenylmethane-diisocyanate or toluylenediisocyanate, as the reacting components. As blowing agents which are necessary for foam formation, the mixtures contain, for example, fluorotrichloromethane or difluorodichloromethane. Additionally the mixtures can contain a tertiary amine, such as, for example, triethylamine, as an activating additive.

Appropriately, 1 to 15%, preferably 10%, of the flameproofing component containing phosphorus are used relative to the solids content of the reaction mixtures for the manufacture of polyurethane foam.

The phosphorus compounds incorporated into the polyurethane foams give extremely flameproof foam articles. Furthermore, additions of such phosphorus compounds do not interfere with the process of manufacture of the foams. On warming for a prolonged period, polyurethane sheets which have been flameproofed in this way are distinguished by good stability.

In part, the phosphorus compounds in question admittedly have an activating effect on the course of the reaction of polyurethane formation, but this influence can be controlled by appropriate metering of the blowing agents and activator additions. The mechanical properties are also not effected by the addition of the phosphorus compounds in that there is practically no occurrence of distortion.

The process can be used to flameproof so-called rigid and soft polyurethane foams. However, the process is preferably used for the flameproofing of polyurethane coatings on substrates containing fibres.

In the examples which follow, the percentages and parts are units by weight, unless otherwise stated.

EXAMPLE 1

211 parts (1 mol) of 3-(dimethylphosphono)-N-methylolpropionic acid amide, 59.5 parts (1 mol) of 99.2% strength acetamide and 1 part of p-toluenesulphonic acid monohydrate in 200 parts of toluene are warmed to the boil in a stirred vessel of 500 parts by volume capacity, equipped with a water separator. 19 parts of water are separated off over the course of 6 hours, after which the condensation is complete. The toluene is removed as far as possible, the reaction product is dissolved in 160 parts of methanol, traces of insoluble constituents are filtered off and the methanol and the remaining toluene are removed in vacuo at 60° C.

250 parts of a semisolid water-soluble product corresponding to the Formula 4 are obtained.

EXAMPLE 2

59.5 parts (1 mol) of 99.2% strength acetamide are dissolved in 83.4 parts (1 mol) of 36% strength aqueous formaldehyde in a stirred vessel of 200 parts by volume capacity which is equipped with a reflux condenser, thermometer and pH-electrode, and the methylolation is carried out for 3 hours at 60–65° C. The pH is kept at 10–11 by adding a total of 3 parts of 30 strength aqueous sodium hydroxide solution. The formaldehyde determination shows that 88.5% methylolation has been achieved.

The methylolated product is introduced into a stirred vessel of 500 parts by volume capacity which is equipped with a water separator, and is mixed with 200 parts of benzene. Thereafter the product is warmed to the boil and is dehydrated azeotropically. After completion of the dehydration, the benzene is replaced by 200 parts of toluene and 181 parts (1 mol) of 3-dimethylphosphon)-propionic acid amide and 1 part of p-toluenesulphonic acid monohydrate are added. The condensation is now carried out for a total of 16 hours at the boiling point of toluene. 16.5 parts of water are collected. Thereafter the toluene is removed as far as possible by siphoning it off and the reaction product is dissolved in 160 parts of methanol. After filtering off traces of insoluble constituents, the methanol and the remaining parts of the toluene are removed in vacuo at 60° C.

232 parts of a semisolid water-soluble product which corresponds to the Formula 4 are obtained.

The characterization of the products according to Examples 1 and 2 with the aid of proton resonance spectroscopy at 60 Megahertz, shows the following chemical shifts $\delta$ in p.p.m.:

1. Singlet at $\delta$ 1.95 p.p.m.
2. Multiplet at $\delta$ 2.0–2.7 p.p.m.
3. Doublet at $\delta$ 3.7 p.p.m.
4. Broad singlet at $\delta$ 4.55 p.p.m.
5. Singlet at $\delta$ 7.85 p.p.m.
6. Singlet at $\delta$ 8.05 p.p.m.

EXAMPLE 3

The procedure indicated in Example 1 is followed but the acetamide is replaced by 93.5 parts (1 mol) of chloroacetamide. 15 parts of water are obtained.

273 parts of a syrupy product, colored red, and corresponding essentially to the Formula 5 are obtained.

EXAMPLE 4

126 parts (0.5 mol) of the compound of the Formula 4, manufactured according to Example 2, are dissolved in 42 parts (0.5 mol) of 36% strength aqueous formaldehyde in a stirred vessel of 200 parts by volume capacity which is equipped with a reflux condenser, thermometer and pH-electrode, and are post-methylolated for 3 hours at 60° C. The pH is kept at 8.5–9.0 by adding NaOH. According to the formaldehyde determination, 57% methylolation of a secondary amide group is achieved.

The product is in the form of an aqueous solution which contains 80% of active substance (calculated as completely methylolated compound).

EXAMPLE 5

239 parts of 3 - (diethylphosphono) - N-methylolpropionic acid amide, 59.5 parts of acetamide (99.2% strength) and 1 part of p-toluenesulphonic acid monohydrate are suspended in 200 parts of m-xylene, in a stirred vessel of 500 parts by volume capacity, equipped with a water separator and thermometer, and are heated to the boil. About 20 parts of water are separated off over the course of 10 hours, after which the condensation is complete. The xylene is removed as far as possible, the reaction product is dissolved in 150 parts of methanol, traces of insoluble constituents are filtered off and the methanol as well as the residual xylene are removed in vacuo at 60° C.

The resulting condensation product (268 parts) is dissolved in 77.6 parts of a 38.6% strength aqueous formaldehyde solution and is methylolated for 4 hours at 60° C. in a stirred vessel of 500 parts by volume capacity equipped with a condenser, thermometer and pH-electrode. The pH is kept at between 8 and 9 by periodic addition of a total of 7 parts of 30% strength NaOH.

After this time, the product contains 15 parts of bonded formaldehyde, corresponding to 100% methylolation of a secondary —CONH group. Thereafter the water is removed in vacuo and the methylolated product is dissolved in 800 parts of methanol. This solution is introduced into a stirred vessel of 1,500 parts by volume equipped with a reflux condenser and thermometer. 30 parts of 37% strength hydrochloric acid are added and the methylol group is etherified for 3 hours at 45–50° C. internal temperature. Thereafter the mixture is neutralized to pH 7 with 30% strength aqueous sodium hydroxide solution and is subsequently concentrated in vacuo at 50° C. to 400 parts by volume. The concentrated solution containing methanol is cooled to 15° C. and traces of insoluble constituents are filtered off. It is then evaporated to constant weight at 50° C. in vacuo.

286 parts of a slightly opalescent viscous liquid are obtained and are dissolved in 500 parts by volume of acetone. After clarification by filtration, 13 parts of a salt-like acetone-insoluble by-product are isolated (mainly sodium chloride).

The acetone solution is evaporated to constant weight and 265 parts of a semisolid product of brownish color are obtained, this being the crude product of the following formula:

(12)

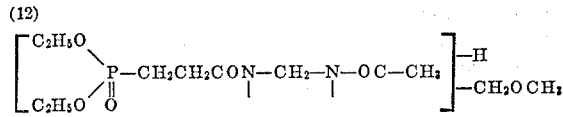

The product is characterized by means of proton resonance spectroscopy at 60 Megahertz, the following chemical shifts δ in p.p.m. being found:

1. Triplet at δ 1.35 p.p.m.
2. Unsymmetrical doublet at δ 2.0 p.p.m.
3. Multiplet of δ 2.15–2.8 p.p.m.
4. Singlet at δ 3.3 p.p.m. (—OCH₃)
5. Singlet at δ 3.7 p.p.m.
6. Quintuplet at δ 4.1 p.p.m.
7. Doublet at δ 4.6 p.p.m.
8. Doublet at δ 8.05 p.p.m.
9. Doublet at δ 8.25 p.p.m.

EXAMPLE 6

470 parts of the product from Example 4 are mixed with 80 parts of the dimethyl ether of pentamethylolmelamine (60% strength) and 20 parts of 85% strength phosphoric acid and diluted to 1,000 parts by volume with water.

A cotton serge fabric is padded in this solution, dried at 80° C. and cured for 4½ minutes at 160° C. The fabric is subsequently subjected to 5 SNV-4 washes and thereafter still shows a fixed deposit of material of 13% of the original fabric weight, which still imparts a good flameproofing effect to the fabric.

EXAMPLE 7

An undyed cotton fabric is padded with the liquors I to IV of the table below and is dried for 30 minutes at 70° C. This is followed by 4½ minutes' curing at 160° C.

The individual pieces of fabric are then tested for their flameproof character (DIN 53,906 vertical test, 6 seconds ignition time). The results of this test are also summarized in the table which follows.

| | Untreated | Treated with liquor— | | | |
|---|---|---|---|---|---|
| | | I | II | III | IV |
| Constituents of the liquor: | | | | | |
| Product according to Example 5 | | 430 | 430 | 430 | 495 |
| Pentamethylolmelamine dimethyl ether, 60% strength | | 80 | 80 | | 90 |
| Dimethylolmelamine | | | | 80 | |
| NH₄Cl | | 4 | | 4 | 4 |
| H₃PO₄ 85% strength | | | 20 | | |
| pH value of the liquor | | 4 | 4 | 5 | 4.5 |
| Flameproof character: | Tear | Burns | | | |
| length, cm. | 7 | 8 | 7.5 | 7.5 | |

EXAMPLE 8

A mixture of 20 g. of a polyol which reacts slowly, 8 g. of fluorotrichloromethane, 21.4 g. of 4,4'-diphenylmethane-diisocyanate and 5 g. of the compound of the Formula 4 or 5 according to Example 2 or 3 is stirred for one minute with a simple paddle stirrer at 1,000 revolutions per minute. Then the foaming mass is immediately introduced into a tube of 5.5 cm. diameter and the reaction is allowed to go to completion therein. At the same time, a polyurethane foam is produced without the addition of compound of the Formula 4 or 5.

Test of flameproof character.—Individual test specimens of size 120 mm. x 30 mm. x 10 mm. are fixed with the 120 mm. edge at an angle of 45° to the horizontal and with the 30 mm. edge horizontal.

At the lower end, the samples are ignited for 10 seconds with a fishtail burner. The following values are found:

| Addition of the compound according to Example | Foam density, g./l. | Length burnt, cm. | Burning time, sec. | Weight loss, percent |
|---|---|---|---|---|
| Without additive | 391 | Burns | Burns | 86 |
| 2 | 720 | 11 | 30 | 47 |
| 3 | 430 | 10 | 5 | 37 |

EXAMPLE 9

A rigid polyurethane foam test specimen is manufactured in the same way as indicated in Example 6, but using a phosphorus compound according to Example 1. At the same time, a foam without added phosphorus compound is also manufactured.

The flameproof character is tested similarly to the instructions in Example 6, but with the angle of inclination of the test specimen being 90°. The following values are thereby obtained:

| Addition of the compound according to Example | Foam density, g./l. | Length burnt, cm. | Burning time, sec. | Weight loss, percent |
|---|---|---|---|---|
| Without additive | 370 | Burns | Burns | 75.5 |
| With additive | 373 | 5 | 3.5 | 14.5 |

EXAMPLE 10

A broad cotton fabric possessing a flameproof finish is coated by the "release" process with the following polyurethane preparations:

| Constituents | Preparation No. | | |
|---|---|---|---|
| | 1 | 2 | 3 |
| Product according to Example (g.): | | | |
| 2 | | 5 | |
| 3 | | | 5 |
| Dimethylformamide/methyl ethyl ketone 1:1, ml. | 10 | 10 | 10 |
| Thermoplastic polyester-polyurethane resin (30% strength solution in DMF/MEK 1:1) | 50 | 50 | 50 |

After drying, the fabric coated in this way is subjected to the test of flameproof character according to DIN 53,906. The ignition time is 10 seconds and the samples are 15 cm. long. A coating without addition of a phosphorus compound is also tested simultaneously.

| Preparation Number | Smouldering time in seconds | Tear length in cm. |
|---|---|---|
| 1 | Burns | |
| 2 | 0 | 10.5 |
| 3 | 0 | 10.5 |

What is claimed is:

1. A phosphorus compound of the formula

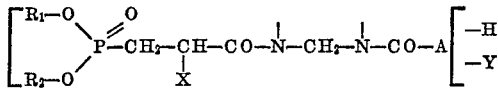

wherein $R_1$ and $R_2$ each denote alkyl, alkenyl or halogenoalkyl with at most 4 carbon atoms, X denotes hydrogen or methyl, Y denotes hydrogen or —$CH_2$—O—Z, Z denotes hydrogen or alkyl with 1 to 4 carbon atoms and A denotes alkyl or halogenoalkyl with at most 4 carbon atoms.

2. A phosphorus compound of the formula

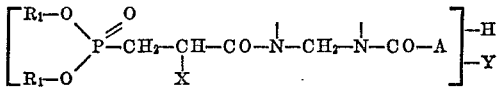

wherein $R_1$, X, Y and A have the meaning indicated in claim 1.

3. A phosphorus compound according to claim 2, characterized in that these correspond to the formula

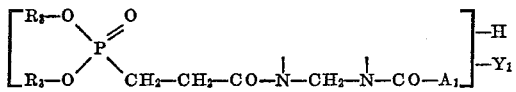

wherein $R_3$ denotes methyl or ethyl, $A_1$ denotes alkyl or halogenoalkyl with 1 or 2 carbon atoms, $Y_1$ denotes hydrogen or —$CH_2$—O—$Z_2$ and $Z_1$ denotes hydrogen or methyl.

4. The phosphorus compound according to claim 3, of the formula

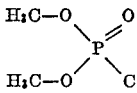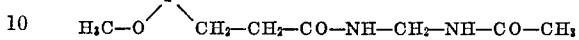

5. The phosphorus compound according to claim 3, of the formula

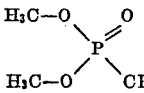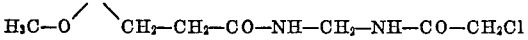

6. The phosphorus compound according to claim 3, of the formula

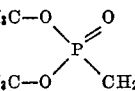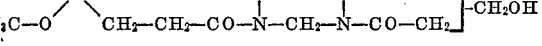

References Cited
UNITED STATES PATENTS 3,351,617  11/1967  Jaeger et al. _____ 260—943 XR
3,381,062  4/1968  Zahir _____ 260—943 XR ANTON H. SUTTO, Primary Examiner U.S. Cl. X.R.

260—2.5 AJ, 968; 106—15 FR